United States Patent [19]

Chu

[11] Patent Number: 4,478,950

[45] Date of Patent: Oct. 23, 1984

[54] ACTIVITY ENHANCEMENT OF HIGH SILICA ZEOLITES BY THERMAL TREATMENT WITH ALKALINE ALUMINATE

[75] Inventor: Pochen Chu, West Deptford, N.J.

[73] Assignee: Mobil Oil Corporation, New York, N.Y.

[21] Appl. No.: 488,505

[22] Filed: Apr. 25, 1983

Related U.S. Application Data

[63] Continuation-in-part of Ser. No. 288,604, Jul. 30, 1981, abandoned.

[51] Int. Cl.$^3$ .......................... B01J 29/28; B01J 37/00
[52] U.S. Cl. ........................................ 502/85; 502/71; 502/77

[58] Field of Search ................ 252/455 Z; 502/64, 71, 502/77, 85, 62

[56] References Cited

U.S. PATENT DOCUMENTS

| | | | |
|---|---|---|---|
| 3,804,746 | 4/1974 | Chu | 208/111 |
| 4,172,843 | 10/1979 | Dwyer et al. | 252/455 Z |
| 4,207,250 | 6/1980 | Butter et al. | 252/455 Z |
| 4,218,573 | 8/1980 | Tabak et al. | 585/481 |

*Primary Examiner*—Carl F. Dees
*Attorney, Agent, or Firm*—A. J. McKillop; M. G. Gilman; D. P. Santini

[57] ABSTRACT

A crystalline high silica-containing zeolite, such as ZSM-5, is hydrothermally treated with aluminate ion to enhance the catalytic activity.

27 Claims, No Drawings

ACTIVITY ENHANCEMENT OF HIGH SILICA ZEOLITES BY THERMAL TREATMENT WITH ALKALINE ALUMINATE

REFERENCE TO COPENDING APPLICATION

This application is a continuation-in-part of copending U.S. application Ser. No. 288,604, filed July 30, 1981 and now abandoned.

BACKGROUND OF THE INVENTION

This invention relates to a method of enhancing the activity of high silica containing crystalline materials by a process which involves hydrothermal contact with solutions containing metallate anions at a pH of at least 7 so as to cause the metal in the solution to become associated with the high silica containing crystalline material and to enhance its activity.

High silica containing zeolites are well known in the art and it is generally accepted that the ion exchange capacity of a crystalline aluminosilicate is directly dependent upon its aluminum content. Thus, for example, the more aluminum there is in a crystalline structure, the more cations are required to balance the electronegativity thereof, and when such cations are of the acidic type such as hydrogen, they impart catalytic cracking activity to the crystalline material. On the other hand, high silica containing zeolites having little or substantially no aluminum have many important properties and characteristics and a high degree of structural stability such that they have become candidates for use in various processes including catalytic processes. Materials of this type are known in the art and include high silica containing aluminosilicates, such as ZSM-5 (U.S. Pat. No. 3,702,886), ZSM-11 (U.S. Pat. No. 3,709,979), and ZSM-12 (U.S. Pat. No. 3,832,449) to mention a few.

The silica-to-alumina mole ratio of a given zeolite is often variable; for example, zeolite X can be synthesized with a silica-to-alumina ratio of from 2 to 3; zeolite Y from 3 to about 6. In some zeolites, the upper limit of silica-to-alumina ratio is unbounded. ZSM-5 is one such example wherein the silica-to-alumina mole ratio is at least 12. U.S. Pat. No. 3,941,871 discloses a crystalline metal organo silicate essentially free of aluminum and exhibiting an X-ray of diffraction pattern characteristic of ZSM-5 type aluminosilicates. U.S. Pat. Nos. 4,061,724, 4,073,865, and 4,104,294 describe microporous crystalline silicas or organo silicates wherein the aluminum content present is at impurity levels.

Because of the extremely low aluminum content of certain silica containing zeolites, their ion exchange capacity is not as great as materials with a higher aluminum content. Therefore, when these materials are contacted with an acidic solution and thereafter are processed in a conventional manner, they are not as catalytically active as their higher aluminum containing counterparts.

There are many patents and technical articles relating to contacting crystalline aluminosilicate zeolites as well as high silica containing materials having substantially no aluminum with solutions of aluminum ions in order to base exchange the aluminum for the cations originally associated with the crystalline materials. Additionally, it is known to incorporate a high silica zeolite into a matrix or binder wherein such processing also involves contacting said crystalline material with aluminum ions. Typical patents concerned with the above techniques would include some of the patents already mentioned, i.e., ZSM-5, ZSM-11, ZSM-12, as well as U.S. Pat. Nos. 3,140,329, 3,629,152, 3,429,830, 3,562,148, 3,582,497, 3,410,808, 3,403,110, merely to mention a few. The novel process of this invention is not concerned merely with a process for incorporating a crystalline zeolite in a binder matrix nor is it concerned with a simple ion exchange process. Rather, it is concerned with a novel process for enhancing the acid activity of a crystalline material. In the prior art previously referred to, there is no teaching of treatment of a ZSM-5 type crystalline material with a solution containing aluminate ions in order to enhance the activity of a crystalline material.

SUMMARY OF THE INVENTION

A unique crystalline zeolite material having enhanced cracking activity (alpha-value) has been discovered by the technique of contacting high silica zeolite under hydrothermal conditions with an alkaline metallate solution comprising at least one tetrahedrally bound hydroxylated metallate at a pH of about 9 to 12, maintaining the zeolite in contact with the solution at elevated temperature under conditions to introduce tetrahedrally coordinated metallate into the crystalline zeolite.

The technique is particularly advantageous for treating acid ZSM-5 type zeolites having a silica:alumina mole ratio greater than 50:1. Alkaline solutions containing aluminate anion may be employed under hydrothermal conditions at elevated temperatures. Nitrogenous bases, such as quaternary ammonium or amine compounds are preferred to maintain the aluminum ion in the desired state for treating the zeolites.

The novel process of this invention permits the preparation of high silica containing materials which have all the desirable properties inherently possessed by such high silica materials and, yet, have an acid cracking activity alpha-value which heretofore has only been possible to be achieved by materials having a higher aluminum content.

DESCRIPTION OF PREFERRED EMBODIMENTS

As has heretofore been stated, the novel process of this invention is concerned with the treatment of high silica containing crystalline material. The expression "high silica containing crystalline material" is intended to define a crystalline structure which has a silica-to-alumina ratio greater than 20 and more preferably greater than 50 up to and including those highly siliceous materials where the silica-to-alumina ratio approaches infinity. This latter group of highly siliceous materials is exemplified by U.S. Pat. Nos. 3,941,871, 4,061,724, 4,073,865, 4,104,294 wherein the materials are prepared from reaction solutions which involve no deliberate addition of aluminum. However, trace quantities of aluminum are usually present due to the impurity of the reaction solutions. It is to be understood that the expression "high silica containing crystalline material" also specifically includes those materials which have other metals besides silica and/or alumina associated therewith, such as boron, iron and chromium, etc. Thus, the only requirement with regard to the starting materials utilized in a novel process of this invention, is that they have a silica-to-alumina ratio greater than about 20, irrespective of what other materials or metals are present in the crystal structure.

The particularly preferred starting materials for the novel process of this invention are those crystalline materials which have an X-ray diffraction pattern characteristic of ZSM-5, ZSM-11 and ZSM-12 irrespective of their chemical composition other than the minimum silica-to-alumina ratio. The preferred starting material for the novel process of this invention is a high silica containing ZSM-5.

The novel process of this invention is simple in nature and easy to carry out although the results obtained therefrom are dramatic. The novel process of this invention is carried out by contacting a high silica containing zeolite either as crystallized or after calcination with a solution containing aluminate anions or the like. Nitrogenous bases and/or alkali metal cations can be employed to achieve a pH of at least 7. Preferably a pH greater than 9 up to about 13 is maintained with organic cations, such as amines or quaternary ammonium compounds.

Being amphoteric, the aluminum ions can be supplied by any suitable organic or inorganic aluminum salt such as chloride, sulfate, nitrate, acetate, etc. However, at a moderately alkaline pH, (eg. pH 9 to 12) a stable Al(OH)$^-_4$ ion becomes available for hydrothermal treatment. This tetrahedral hydroxylated metallate ion is uniquely adapted for enhancing catalycic cracking activity. Other hydroxylated metallates which can be tetrahedrally coordinated in the zeolite crystalline structure include Ga(OH)$^-_4$, FE(OH)$^-_4$, and B(OH)$^-_4$.

The organic nitrogen-containing cation utilized in the hydrothermal solution can be a tetraalkylammonium cation, such as tetraethylammonium, tetrapropylammonium, tetrabutylammonium, methyl triethylammonium, methyl tripropylammonium, as well as mixtures thereof. The nitrogenous base can include various primary, secondary or tertiary amines especially normal alkyl amines such as n-propylamine, n-butylamine. It is advantageous to carry out the treatment at a pH of at least 7 up to about 13, and most preferably at a pH of 9 to 12. In addition to the organic bases, pH control can be accomplished by adding a suitable inorganic base such as sodium hydroxide, to a solution of organic nitrogen-containing cation and aluminum ion.

A particularly preferred embodiment is to use an alkali metal aluminate as the source of aluminum ion. This anion species may be prepared in situ by adding a base such sodium hydroxide to an aqueous solution of an aluminum salt such as aluminum sulfate, or by dissolving sodium aluminate directly.

The relative proportion of aluminum ion and organic nitrogen-containing cation present in the solution is not narrowly critical and usually ranges from 1 to 150 grams of equivalent aluminum salt per liter of solution and 1 to 200 grams of organic compound per liter of solution. The most preferred solvent is water for reasons of economy and ease of operation; however, various cosolvents may be employed within the inventive concept.

The amount of solution utilized to treat the high silica containing zeolites is not critical and the solution to zeolite ratio can vary from 1 to 100 grams of solution per gram of zeolite. The amount of solution will vary as a function of its reaction kinetics concentration and desired enhancement of activity.

The process is carried out by treating said high silica zeolite as crystallized or after calcination with the above described solution at elevated temperatures ranging from 50° C. to 300° C. and preferably from 80° C. to 160° C. for periods of time ranging from 1 hour to 30 days, preferably from 1 to 5 days. The hydrothermal conditions may require super atmospheric pressures at above 100° C. to maintain adequate ionizing medium to maintain the aluminate ion. Autogenous pressure can be maintained by autoclave or the like. Ordinarily pressures of 100 kPa to 10,000 kPa are satisfactory.

Following the treatment, the high silica-containing zeolite may be further processed into its catalytically active form by conventional techniques, such as base exchange with appropriate cations such as hydrogen, ammonium, rare earth, and mixtures thereof. The high silica-containing materials are then calcined by heating to a temperature in the range of 200°-600° C. in an atmosphere such as air, nitrogen, etc., and atmospheric, subatmospheric, or superatmospheric pressures for between about 1 and 48 hours. It is to be undestood that the high silica-containing zeolites can, if desired, be incorporated in a matrix by techniques well known in the art. Conventional binder matrices include inorganic oxides, such as silica, alumina, silica-alumina, etc. The following examples will illustrate the novel process of this invention.

EXAMPLE 1

Three different high silica-containing zeolites of ZSM-5 type are treated with a solution which was prepared by dissolving 2.55 grams of sodium hydroxide, 10.0 grams of tetrapropylammonium bromide and 7.2 grams of Al$_2$(SO$_4$)$_3$.14H$_2$O and 115 grams of water. The hydro-treating conditions are maintained at 100° C. (212° F.) for 6 hours at 1 atmosphere pressure. The solution to zeolite weight ratio is 3.4 parts of solution per part of zeolite and its pH is 9.9.

Zeolite A is a ZSM-5 zeolite having a silica:alumina ratio of 500:1 Zeolite B is a ZSM-5 zeolite having a silica:alumina ratio of 1600:1 and Zeolite C is a ZSM-5 zeolite having a silica:alumina ratio in excess of 30,000:1.

Zeolites A and B, having silica-to-alumina ratios of 500 and 1600 are precalcined in nitrogen at 540° C. (1000° F.) for 3 hours prior to treatment. Zeolite C was used as crystallized without pre-calcination. After the three zeolites have been hydrotreated in accordance with the above procedures, they are processed into their active form by calcination in nitrogen at 540° C. (1000° F.), followed by ammonium exchange with an aqueous solution of ammonium nitrate at ambient temperatures to remove sodium and/or excess aluminum ions. Finally, all materials are air calcined at a temperature of 540° C. (1000° F.) for three hours. The three zeolites, before and after treatment, are evaluated for hydrocarbon cracking activity (alpha-value, "α").

As is well known in the art, the alpha value gives an approximate indication of the acid catalytic cracking activity of the catalyst compared to a standard catalyst, and it is the relative rate constant of normal hexane conversion per unit volume of oxides per unit time. It is based on the activity of active silica-alumina cracking catalysts taken as an alpha of 1, and this test is described in U,S. Pat. No. 3,354,078 and the Journal of Catalysis, Volume 4, pages 522–529, August 1965. The results obtained are shown in the following table:

TABLE 1

Activity of High SiO$^2$ ZSM-5 After Treatment

| Material | A | B | C |
|---|---|---|---|
| Zeolite | ZSM-5 | ZSM-5 | ZSM-5 |
| SiO$_2$/Al$_2$O$_3$ | 500:1 | 1600:1 | >30,000:1 |
| Form | Acid (Calcined) | Acid (Calcined) | Acid (As Crystallized) |
| $\alpha$o(Untreated acid form) | 10 | 1.7 | 0.1 |
| $\alpha$T(Treated acid form) | 27 | 15 | 2.3 |
| Enhancement, $\alpha$T/$\alpha$o | 2.7 | 8.8 | 23 |

From the above table, it can be seen that the novel process of this invention resulted in a marked increase of activity. Thus, the ZSM-5 having a silica-to-alumina ratio of 500 had an alpha value of 10 prior to activation in accordance with the novel process of this invention, and thereafter its activity was raised to a value of 27. The effects of the alpha enhancement are more pronounced as the silica-to-alumina ratio increases.

COMPARATIVE EXAMPLES 2-8

The following comparative examples demonstrate that the simple addition of aluminum either by impregnation or exchange cannot achieve the activity enhancement of high silica zeolites.

EXAMPLE 2

Four grams of type C low Al ZSM-5 (containing 50 ppm Al$_2$O$_3$) in its NH$_4$ form are impregnated with solution of 0.03 g Al(NO$_3$)$_3$9H$_2$O in 2 g water. The wet zeolite mix is dried slowly, slugged and sized into 14/25 mesh. The resultant catalyst is activated at 540° C. (1000° F.) for three hours. The alpha value is 0.38.

EXAMPLE 3

Zeolite C catalyst is treated in ammonium form in a manner similar to those described in Example 2 except using 0.15 g Al(NO$_3$)$_3$.9H$_2$O. The alpha value is 0.56.

EXAMPLE 4

Ammonium Zeolite C is treated in a manner similar to Example 2 except using 0.3 g Al(NO$_3$)$_3$.9H$_2$O. The alpha value is 0.81.

EXAMPLE 5

Zeolite C is treated by impregnating 4 g of Type C low alumina ZSM-5 in its NH$_4$ form with 0.13 g NaAlO$_2$ dissolved in 2 g of H$_2$O. The wet mix was dried at 110° C. (230° F.) for three hours and then calcined at 540° C. (1000° F.) for three hours. The Na content of the sample was reduced by NH$_4$ exchange. The sample was finally sized to 14/25 mesh and activated at 540° C. (1000° F.) for three hours again. The alpha activity of the sample was 0.1.

EXAMPLE 6

This catalyst is prepared in a similar manner as described in Example 5 except that the "as crystallized" low alumina ZSM-5 is used as base material. The alpha value was 0.43.

EXAMPLE 7

Four grams of "as synthesized" low alumina ZSM-5 is exchanged with a solution of 1.5 g Al(NO$_3$)$_3$.9H$_2$O in 20 ml of H$_2$O. After mixing for 2 hours the sample is filtered, washed and dried. The sample is then sized to 14/25 mesh and calcined at 1000° F. for three hours and then exchanged with NH$_4$NO$_3$ solution to remove Na to 0.02% wt. The catalyst is finally activated in air at 540° C. (1000° F.) for three hours. The alpha activity of the catalyst is found to be 0.24.

EXAMPLE 8

This catalyst is treated in a similar manner to Example 7 except that 1.18 Al$_2$(OH)$_5$Cl is used instead of Al(NO$_3$)$_3$.9H$_2$O. The alpha activity of the catalyst was found to be 0.31.

The results obtained in Examples 2-8 are shown in Table 2, wherein it is demonstrated that the results obtained are distinctly inferior to the claimed invention as illustrated in Table 1.

TABLE 2

Aluminum Addition to High Silica Zeolites

| Example No. | 2 | 3 | 4 | 5 | 6 | 7 | 8 |
|---|---|---|---|---|---|---|---|
| Base Material | | | | | | | |
| Zeolite | ←---------------------ZSM-5---------------------→ | | | | | | |
| SiO$_2$/Al$_2$O$_3$ | ←---------------------30,000---------------------→ | | | | | | |
| Form | NH$_4$ | NH$_4$ | NH$_4$ | NH$_4$ | As Crystallized | | |
| Treating Agent | Al(NO$_3$)$_3$ ←---------→ NaAlO$_2$ ---→ Al(NO$_3$)$_3$ | | | | | | Al$_2$(OH)$_5$Cl |
| Method of Treat | Impregnation ←------------------→ EXCH | | | | | | EXCH |
| % Al$_2$O$_3$ Incorporated (Based on Zeolite) | 0.1 | 0.5 | 2 | 0.5 | 0.5 | 0.5 | 0.5 |
| Alpha of H Form Untreated | ←---------------0.2---------------→ | | | | | | |
| Treated | 0.38 | 0.56 | 0.81 | 0.2 | 0.43 | 0.24 | 0.31 |

What is claimed is:

1. A method for enhancing the activity of a high silica-containing crystalline zeolite material having a silica-to-alumina ratio greater than 20 which comprises contacting said material with a solution containing organic cations selected from the group consisting of tetraalkylammonium, cations of alkylamines and mixtures thereof and aluminum ions for a period of time of from 1 hour to 30 days at a temperature of from 50° C. to 300° C. at autogenous pressures and at a pH of at least 7, calcining said solution contacted material at a tempeature of from 200° C. to 600° C., ion exchanging said calcined material, and calcining said ion-exchanged material at a temperature of from 200° C. to 600° C.

2. The method of claim 1 wherein the aluminum ions are supplied by an organic or inorganic aluminum salt.

3. The method of claim 1 wherein the organic cations comprise tetraalkylammonium cations.

4. The method of claim 2 wherein the aluminum salt comprises alkali metal aluminate.

5. The method of claim 4 wherein the zeolite material has a silica-to-alumina mole ratio in excess of 500:1.

6. The method of claim 5 wherein the zeolite material has a silica-to-alumina mole ratio in excess of 1600:1.

7. The method of claim 6 wherein the zeolite material has a silica-to-alumina mole ratio greater than 30,000:1.

8. The method of claim 5 wherein the alkali metal aluminate is sodium aluminate.

9. The method of claim 3 wherein the tetraalkylammonium cations are selected from the group consisting of tetraethylammonium, tetrapropylammonium, tetrabutylammonium, methyltriethylammonium, methyltripropylammonium and mixtures thereof.

10. The method of claim 1 wherein the organic cations are of alkylamine.

11. The method of claim 10 wherein the alkylamine is selected from the group consisting of propylamine, butylamine and mixtures thereof.

12. The method of claim 1 wherein the zeolite material comprises an acid zeolite selected from the group consisting of ZSM-5, ZSM-11 and ZSM-12.

13. The method of claim 1 wherein the solution contacting step is conducted for a period of time of from 1 day to 5 days, at a temperature of from 80° C. to 160° C. and at a pH of from 7 to 13.

14. The method of claim 1 wherein the ion exchanging step comprises exchanging originally present cations of the zeolite material with cations selected from the group consisting of hydrogen, ammonium, rare earth and mixtures thereof.

15. A method for enhancing the activity of a high silica-containing crystalline zeolite material having the crystal structure of zeolite ZSM-5 and a silica-to-alumina mole ratio greater than 20 which comprises contacting said material with a solution containing organic cations selected from the group consisting of tetraalkylammonium, cations of alkylamine and mixtures thereof and aluminum ions for a period of time of from 1 hour to 30 days at a temperature of from 50° C. to 300° C. at autogenous pressures and at a pH of at least 7, calcining said solution contacted material at a temperature of from 200° C. to 600° C., ion exchanging said calcined material, and calcining said ion-exchanged material at a temperature of from 200° C. to 600° C.

16. The method of claim 15 wherein the zeolite material has a silica-to-alumina mole ratio in excess of 500.

17. The method of claim 16 wherein the zeolite material has a silica-to-alumina mole ratio in excess of 1600.

18. A crystalline zeolite material having enhanced activity prepared by the method of contacting a high silica-containing crystalline zeolite material having a silica-to-alumina mole ratio greater than 20 with a solution containing organic cations selected from the group consisting of tetraalkylammonium, cations of alkylamine and mixtures thereof and aluminum ions for a period of time of from 1 hour to 30 days at a temperature of from 50° C. to 300° C. at autogenous pressures and at a pH of at least 7, calcining said solution contacted material at a temperature of from 200° C. to 600° C., ion exchanging said calcined material, and calcining said ion-exchanged material at a temperature of from 200° C. to 600° C.

19. The zeolite material of claim 18 which has the crystal structure of ZSM-5, ZSM-11 or ZSM-12.

20. The zeolite material of claim 19 which has the crystal structure of ZSM-5.

21. A method for increasing acid cracking activity of a high silica-containing zeolite having crystalline acid structure and having a silica-to-alumina mole ratio greater than 20, which comprises contacting said zeolite with an aqueous alkaline solution containing aluminate ion for a period of time ranging from 1 hour to 30 days at a temperature of from 80° C. to 160° C. at autogenous pressures at a pH of at least 9, thereby introducing tetrahedrally coordinated aluminum into the crystalline zeolite sructure.

22. The method of claim 21 wherein the aluminate ion is supplied by sodium aluminate.

23. The method of claim 21 wherein the solution contains quaternary ammonium cation or amine cation.

24. A method for treating high silica crystalline zeolite to increase cracking activity which comprises contacting the zeolite with an aqueous alkaline aluminate solution at elevated temperature under conditions effective to introduce tetrahedrally coordinated aluminum in the zeolite crystalline structure.

25. A process for enhancing cracking activity of an acid ZSM-5 type crystalline zeolite catalyst having a silica:alumina mole ratio greater than 50:1 which comprises contacting the zeolite under hydrothermal conditions with an alkaline metallate solution comprising at least one tetrahedrally bound hydroxylated metallate at a pH of about 9 to 12, and maintaining the zeolite in contact with the solution at elevated temperature under conditions effective to introduce tetrahedrally coordinated metallate into the crystalline zeolite.

26. The process of claim 25 wherein the solution contains an activating amount of aluminate ion together with nitrogenous base cation and alkali-metal ion.

27. The process of claim 26 wherein the solution contains an activating amount of aluminate ion together with nitrogenous base cation and alkali metla ion at a pH of at least 9.

* * * * *